United States Patent Office 3,433,657
Patented Mar. 18, 1969

3,433,657
PREVENTION OF ALKALI-AGGREGATE
REACTIONS IN CONCRETE
Ritha Edva Pickering, No. 107 Grenaavej,
Aarhus-Risskov, Denmark
No Drawing. Filed Nov. 19, 1964, Ser. No. 412,342
Claims priority, application Denmark, Nov. 21, 1963,
5,466/63
U.S. Cl. 106—97     7 Claims
Int. Cl. C04b 7/32, 7/02

ABSTRACT OF THE DISCLOSURE

Concrete is protected from alkali-aggregate reactions by soaking the concrete with water, and applying to the surface of the concrete structure an aqueous slurry containing an inorganic cement, an acid, for example, an organic hydroxy carboxylic acid such as glyceric acid, which forms complexes with calcium ions or aluminum ions, or a salt of such an acid, and a base such as sodium aluminate, potassium orthosilicate, or borax, which forms an insoluble salt with calcium ions or aluminum ions.

---

This invention relates to a composition and a process for improving the durability of concrete, masonry, natural stone, e.g., sand stone, plaster and the like materials, especially for protecting concrete against cement-aggregate reactions.

As long as it has been known to make concrete, the makers thereof have—though at the beginning they have not known the reason for the phenomena observed—fought against the problem: cement-aggregate reactions, i.e., reactions between alkali metal compounds and aggregate in concrete. Experience has shown that in some cases concrete is exposed to these detrimental reactions, and it will then, the older it grows, brittle more and more with the occurrence of the so-called pattern cracking. It has not heretofore been possible to take adequate and effective measures thereagainst.

In various ways the mechanical strength of concrete has been increased through better cement qualities, application of the most favourable grain curve distributions possible in the sand used and by different forms of reinforcements. The reinforcement iron used is, however, also exposed to decomposition with consequential weakening of the mechanical strength of the concrete.

The composition according to the present invention solves both the problem of alkali reactions in concrete and the problem of corrosion of reinforcement irons, if such are used, just as well as it may be used for the protection of the above-mentioned materials and the like materials against decomposition which may be ascribable to chemical reactions. Also an initiated decomposition may be stopped by using the composition.

The composition is characteristic in that it consists of a mixture comprising cement and an acid which forms complexes with calcium ions or aluminum ions, or a salt of such acid, and a base which forms salts with calcium ions or aluminum ions which salts are insoluble or only slightly soluble in water, and possible fillers, such as sand. As acids which form complexes with calcium ions or aluminum ions, it is especially preferable to use hydroxy-carboxylic acids, such as citric, gluconic, glyceric, and malic acids. As complex-forming agents reference can further be made to polyphosphates.

The said complex-forming acid or the salt thereof and the said base may expediently be incorporated in the composition in a ratio by weight of between 1:25 and 1:1.

A preferred composition consists of 80 parts by weight of cement, 2-10 parts by weight of complex-forming acid or a salt thereof and 10-50 parts by weight of base.

In use the composition is suspended in water (about 1 part by weight of powder to 0.8 to 1 part by weight of water) and is then applied to the surface of the object to be protected, for example, brushed on, sprayed on, applied by rough-casting, or smoothed on. Preferably the composition is applied to the surface of the object after the object has been soaked with water.

Before the mixture of the pulverulent composition and water is applied to the surface concerned, the mechanical strength of the mixture may, if so desired, be increased by adding sand or other fillers and, if necessary, further cement if the composition does not in advance contain optimum quantities thereof.

The object to be treated should preferably be wet all through when the application takes place. The complexes and salts formed by suspending the composition in water will then despite the fact that the mixture was applied to the surface have a depth-effect in that they make their way into the treated material, for example concrete, through the capillary system thereof and exert their effect through the entire mass of the material.

Is is assumed that the favourable effect of the composition according to the invention depends for one thing on the fact that the complexes formed by suspending the composition in water bind varying quantities of crystal water and thereby stop the travel of salts which may have a disintegrating effect on concrete as well as on reinforcement iron, and depends for another thing on the fact that at the formation of complexes a binding of $SiO_2$, which in soluble form might be present in the aggregate and/or the cement, takes place. However, the invention is not limited to this hypothesis.

Even if the salts which are supplied to the concrete by brushing-on the composition according to the invention mixed with water contain alkali metals, it turns out that alkali reactions in the concrete do not occur at all so that the strength of the concrete even after long time has not decreased. On the contrary it has been possible to show an increase of the mechanical strength.

Three examples of compositions according to the invention are given below

Example 1

| | G. |
|---|---|
| Portland cement | 80 |
| Glyceric acid | 2 |
| Sodium aluminate | 15 |

Example 2

| | G. |
|---|---|
| Rolandshütte Super cement | 80 |
| Malic acid | 4 |
| Potassium orthosilicate | 20 |

Example 3

| | G. |
|---|---|
| Aluminate cement | 80 |
| Citric acid | 5 |
| Borax | 45 |

I claim:
1. A process for preventing alkali-aggregate reactions in concrete which contains aggregates which are potentially reactive, which comprises soaking a concrete structure with water, and then applying to the surface of the concrete structure an aqueous slurry containing a mixture of the following three components in the ratios stated, calculated upon the total mixture, (1) about 80 parts by weight of an inorganic cement selected from the group consisting of Portland cement, Rolandshütte Super cement, and aluminate cement, (2) about 2-10 parts by weight of a member selected from the group consisting of organic acids and salts of said acids which form substantially insoluble complexes with ions selected from the group consisting of calcium ions and aluminum ions, and (3) about 10–50 parts by weight of a base which forms substantially insoluble salts with ions selected from the group consisting of calcium ions and aluminum ions, said aqueous slurry being added in an amount effective to impart protection against alkali-aggregate reactions.

2. A process according to claim 1, wherein said slurry further contains a filler.

3. A process according to claim 1, wherein said member (2) is selected from the group consisting of citric acid, gluconic acid, glyceric acid, malic acid, and salts thereof.

4. A composition comprising a dry mixture of the following three components in the ratios stated, calculated upon the total mixture, (1) about 80 parts by weight of an inorganic cement selected from the group consisting of Portland cement, Rolandshütte Super cement, and aluminate cement, (2) about 2–10 parts by weight of a member selected from the group consisting of citric acid, gluconic acid, glyceric acid, malic acid, and salts thereof and (3) about 10–50 parts by weight of a base which forms substantially insoluble salts with ions selected from the group consisting of calcium ions and aluminum ions.

5. A composition according to claim 4, which consists essentially of about 80 parts by weight of Portland cement, about 2 parts by weight of glyceric acid, and about 15 parts by weight of sodium aluminate.

6. A composition according to claim 4, which consists essentially of about 80 parts by weight of Rolandshütte Super cement, about 4 parts by weight of malic acid, and about 20 parts by weight of potassium orthosilicate.

7. A composition according to claim 4, which consists essentially of about 80 parts by weight of aluminate cement, about 5 parts by weight of citric acid, and about 45 parts by weight of borax.

References Cited

UNITED STATES PATENTS

| | | | |
|---|---|---|---|
| 1,534,240 | 4/1925 | Newberry | 106—89 |
| 1,657,956 | 1/1928 | Chatelain | 106—90 |
| 1,659,863 | 2/1928 | Dulac | 106—76 |
| 2,203,302 | 6/1940 | Liberthson | 106—12 |
| 2,393,597 | 1/1946 | Drummond | 106—76 |
| 2,522,707 | 9/1950 | Faber et al. | 106—76 |
| 2,672,424 | 3/1954 | Avery | 106—90 |
| 2,709,835 | 6/1955 | Fuese | 106—76 |
| 3,047,407 | 7/1962 | Ehuenburg | 106—12 |

FOREIGN PATENTS

| | | |
|---|---|---|
| 281,022 | 11/1927 | Great Britain. |
| 405,508 | 2/1934 | Great Britain. |

OTHER REFERENCES

Leaf Desch: The Chemistry of Cement and Concrete, Edward Arnold Ltd., London, 2nd edition; 1956, pp. 493–498.

TOBIAS E. LEVOW, Primary Examiner.

SAMUEL, E. MOTT, Assistant Examiner.

U.S. Cl. X.R.

106—76, 90, 104